Figure 1:
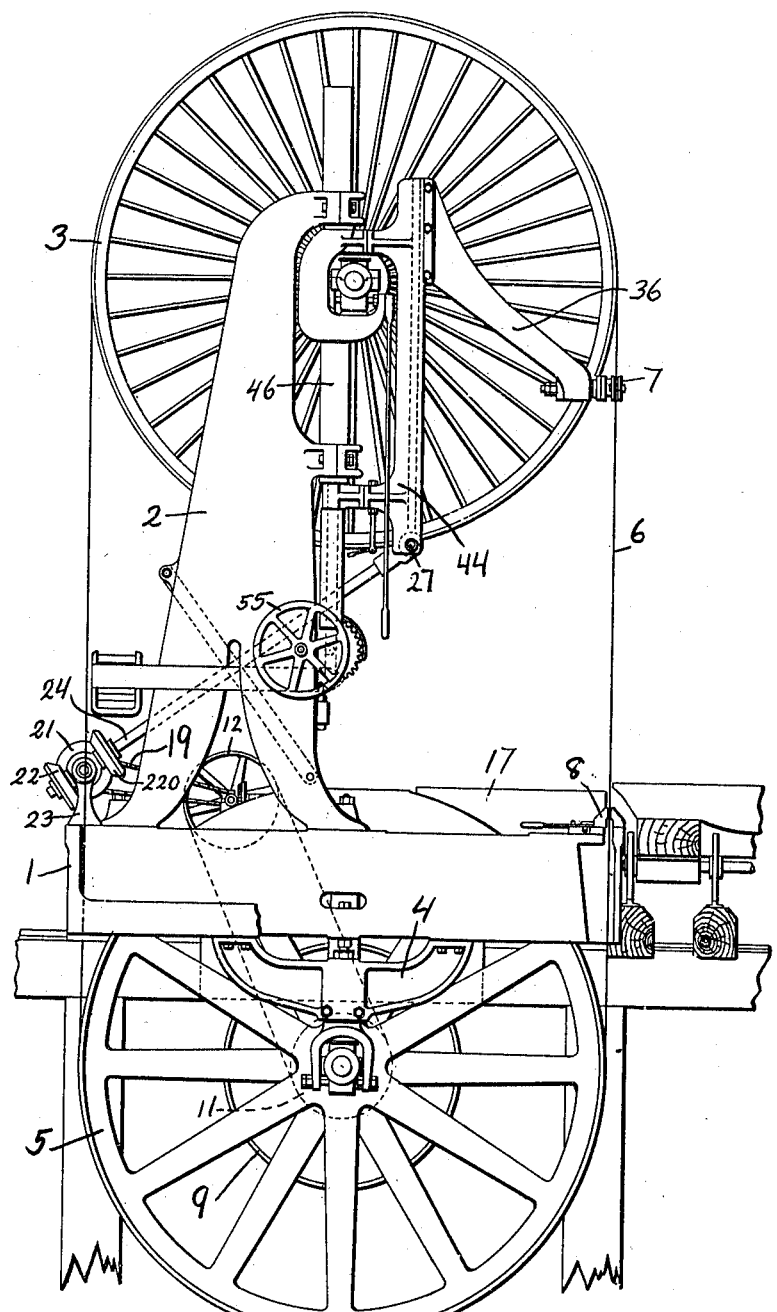

W. H. TROUT.
BAND SAW MILL.
APPLICATION FILED FEB. 8, 1907.

978,412.

Patented Dec. 13, 1910
5 SHEETS—SHEET 1.

WITNESSES:
Frank E. Dennett
John C. Renne

W. H. Trout INVENTOR
BY
ATTORNEY.

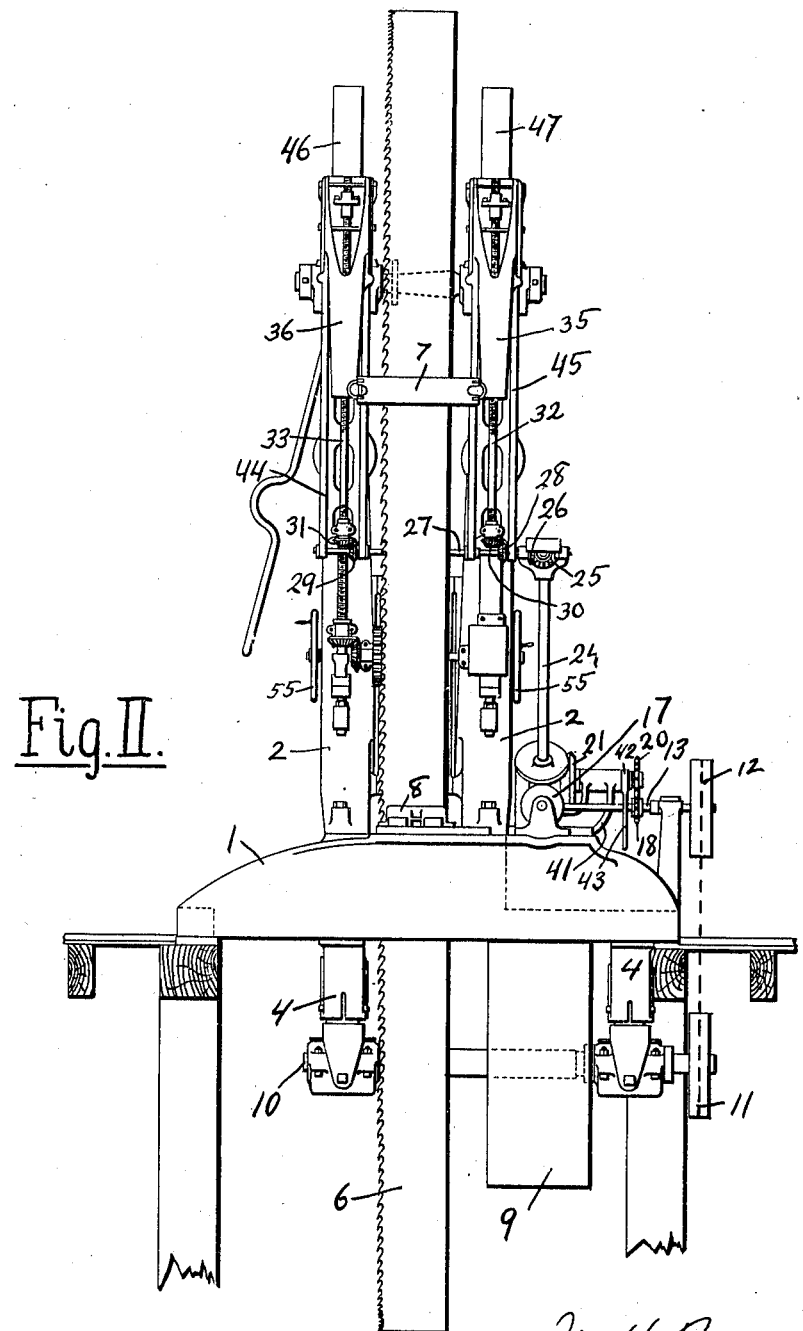

W. H. TROUT.
BAND SAW MILL.
APPLICATION FILED FEB. 8, 1907.
978,412.
Patented Dec. 13, 1910.
5 SHEETS—SHEET 3.
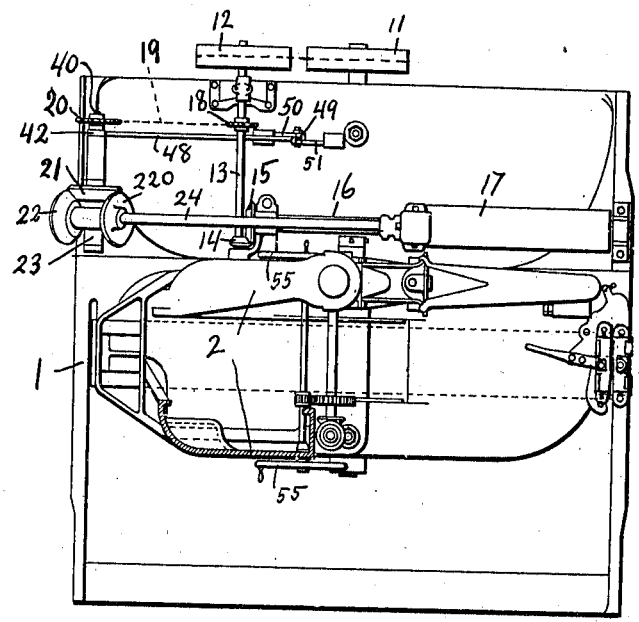
Fig. III.

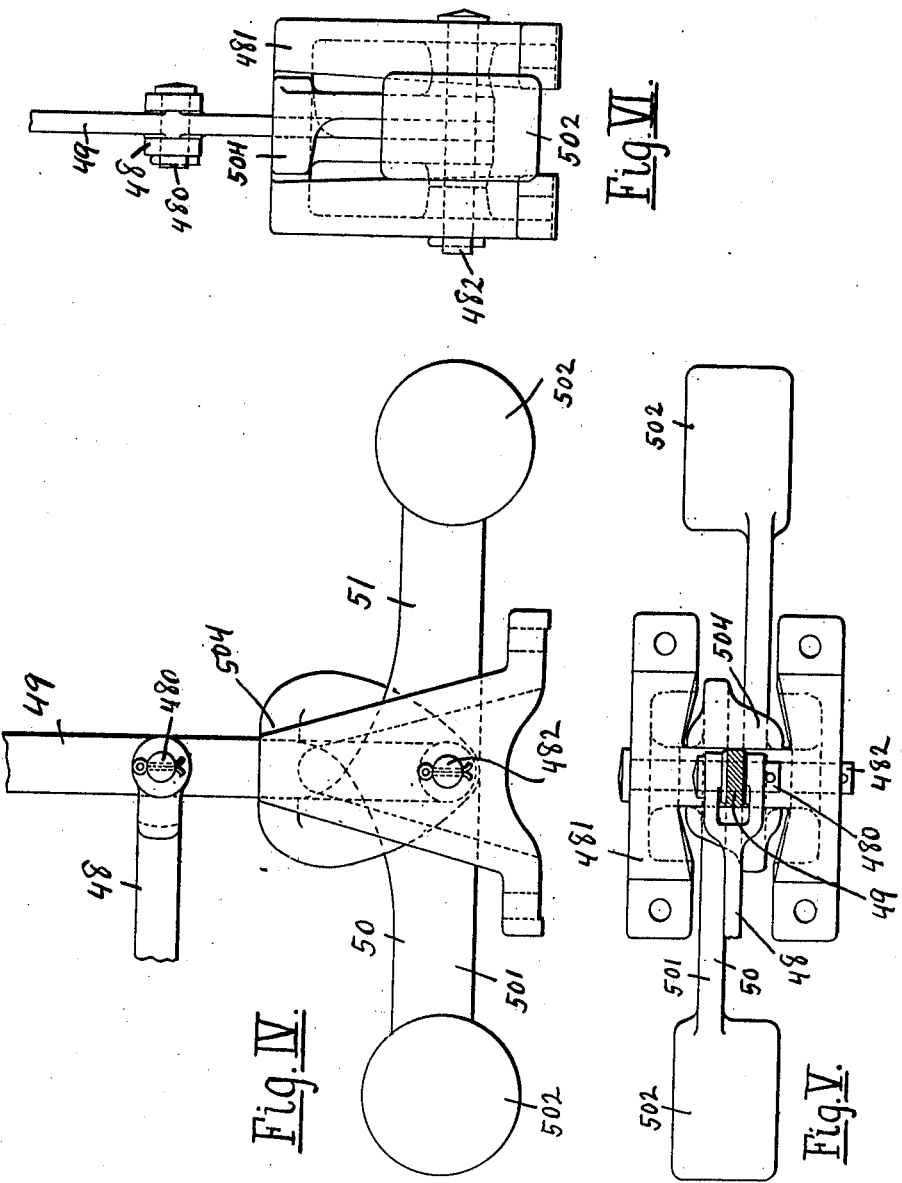

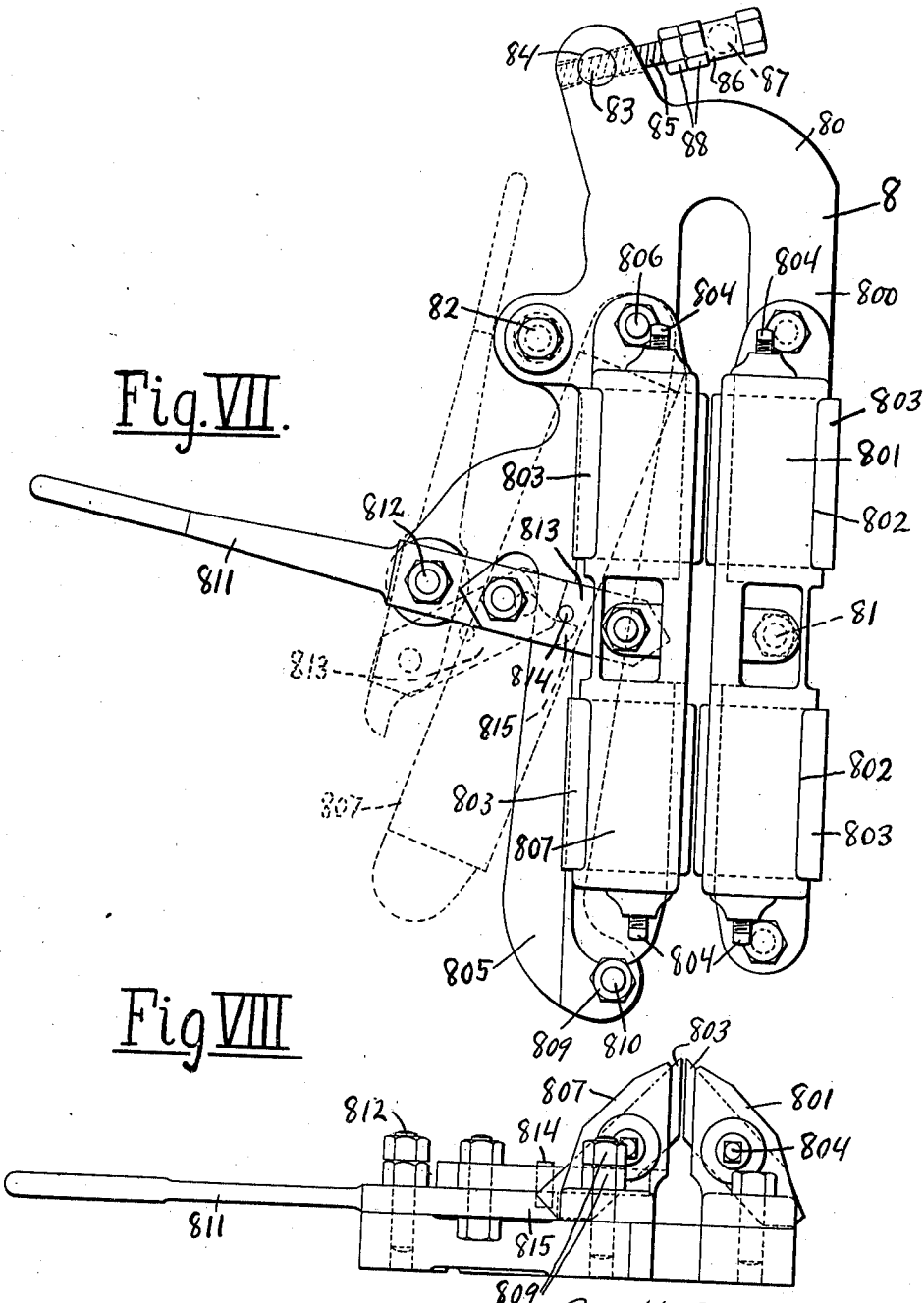

UNITED STATES PATENT OFFICE.

WILLIAM H. TROUT, OF MILWAUKEE, WISCONSIN, ASSIGNOR TO ALLIS-CHALMERS COMPANY, OF MILWAUKEE, WISCONSIN, A CORPORATION OF NEW JERSEY.

BAND-SAW MILL.

978,412.  Specification of Letters Patent.  Patented Dec. 13, 1910.

Application filed February 8, 1907. Serial No. 356,445.

*To all whom it may concern:*

Be it known that I, WILLIAM H. TROUT, a subject of the King of Great Britain, residing at Milwaukee, in the county of Milwaukee and State of Wisconsin, have invented certain new and useful Improvements in Band-Saw Mills, of which the following is a specification.

This invention relates to band saw mills and more specifically to the general construction and arrangement of such mills and the accessories used therewith.

On the drawings which accompany this specification and form a part thereof, and on which the same reference characters are used to designate the same elements wherever they may appear in each of the several views, Figure 1 represents a side elevation of a band saw mill embodying this invention. Fig. 2 represents an elevation taken at right angles to the view as shown by Fig. 1, looking from the carriage side of the mill. Fig. 3 is a plan view, certain parts being omitted and others broken away in order to clearly show the relationship of certain parts of the mechanism. Figs. 4, 5 and 6 are respectively a side elevation, a plan view, and an end elevation of a detail. Figs. 7 and 8 are a plan view and an end elevation respectively of a detail.

Referring to the drawings, the numeral 1 designates the bedplate of a band saw mill upon which are supported the uprights 2 which support the upper saw wheel 3, and depending from said bed 1 are the brackets 4, from which is suspended the lower saw wheel 5, all of which parts may be of any preferred or ordinary construction.

The numeral 6 designates the saw which passes around wheels 3 and 5 and is guided by the upper guide 7 and the lower guide 8.

The numeral 9 designates the belt pulley which is secured to the shaft 10, which also carries the lower saw wheel 5, by which the saw is driven.

The numeral 11 designates a band wheel, or its equivalent, located upon the shaft 10 from which motion may be communicated to the band wheel 12 located on the shaft 13, said shaft being provided with a bevel wheel 14 which meshes with the bevel wheel 15 secured to the shaft 16 to which is also secured the live roll 17.

Upon the shaft 13 is the sprocket wheel 18, the chain 19 gearing with which engages with the sprocket wheel 20 secured to a shaft upon which is also secured the friction wheel 21, said friction wheel 21 being preferably beveled and located between a pair of opposed bevel friction wheels 22 and 220 which are movably supported upon a pedestal 23 and are slidably engaged with a shaft 24 to which is secured a bevel gear 25, with which meshes a bevel gear 26 secured to a shaft 27, which shaft carries bevel wheels 28 and 29, which in turn gear with the bevel wheels 30, 31, said last mentioned bevel wheels are secured to screw threaded rods 32 and 33 with the screw-threaded portions of which rods are engaged the arms 35, 36, which carry the upper saw guide 7.

The bevel friction wheel 21 and sprocket wheel 20 for driving the same are mounted upon a common shaft 40, said shaft being supported by a standard 41 which is suitably bored to receive not only the shaft 40, but also a sleeve 42 to which is secured the crank arm 43.

The shaft 40 is mounted eccentrically with respect to the axis of the sleeve 42 and by oscillating said sleeve 42 by means of the lever 43, the bevel friction wheel 21 is brought into contact either with the friction wheel 22 or the friction wheel 220; and as the sprocket wheel 20 during the operation of the apparatus is being constantly rotated in one direction by means of the chain 19, sprocket wheel 18 and band pulleys 12 and 11, the engagement of said wheel 21 with said wheel 22, for example, will rotate the shaft 24 in one direction; while if the bevel wheel 21 is engaged with the bevel wheel 220, it will rotate said shaft 24 in the opposite direction, resulting in either raising or lowering both arms 35 and 36 and the upper saw guide 7 which is secured to each of said arms.

It has already been explained that shaft 24 is slidable through the friction gears 22 and 220, being keyed thereto, and the reason for this construction is due to the fact that the brackets 44 and 45 which carry the adjusting screws 33 and 32, are secured to the vertically adjustable columns 46 and 47, which carry the upper saw wheel 3. The shaft 24 is secured to the shaft 27 by a coupling which permits shaft 24 to swing with respect to shaft 27.

The numeral 48 designates a link which is pivotally secured to the crank arm 43 at one end and to the lever 49 at its opposite end, the lever 49 being provided with the weighted levers 50 and 51 to normally retain it in a vertical position.

The operation of the apparatus thus far described is as follows: If it be desirable to use a longer or shorter saw, or change the tension of the saw, the upper wheel is raised or lowered by an ordinary form of raising and lowering mechanism which is sufficiently indicated by the drawings and in such common use as to require no extended description. When the upper wheel is moved either up or down by this mechanism, the brackets 44 and 45 are likewise moved up and down, retaining the upper saw guide 7 in the same relation with respect to the upper wheel, no matter what length of saw is used. This motion is permitted by the shaft 24 slipping back and forth through the bevel friction gears 22 and 220. If now it should be desirable to adjust the upper saw guide 7 either toward or away from the upper band wheel 3, the lever 49 is thrown to move the rotating bevel friction gear 21 either against the bevel friction gear 22 or against the bevel friction gear 220, the effect being that the screw-threaded rods 32 and 33 are rotated and the arms 35 and 36 are moved either up or down as the case may be.

The numeral 55 designates the hand wheels by which the columns 46 and 47 are moved up and down by the train of gears and screws shown.

Referring to Figs. 4, 5 and 6 of the drawings, the numeral 49 designates the operating lever above referred to; 48 the link pivotally connected therewith by pin 480; 50 and 51 the two weighted levers which hold the lever 49 normally in a vertical position and return it to a vertical position, rendering the bevel friction wheel 21 inactive when the operator releases said lever. Numeral 481 designates a casting, of which two are provided, one being a duplicate of the other. Each of these castings is provided with an upwardly extended portion from which projects a lug toward the other when they are assembled in their proper relation. The lever 49 is secured to a pivot 482 which passes through apertures in said castings below said lugs, and this lever 49 occupies a position between the two lugs of the casting, as clearly shown by Fig. 5 of the drawings. The weighted levers 50, 51, which have been designated by distinct reference characters in order that the operation of the apparatus might be entirely clear, are duplicates each of the other, and each consists essentially of a bell crank lever to one arm, 501, of which is secured a weight 502, while to the other arm 503 is secured a lug 504 which projects at right angles to the general plane of the bell crank lever as a whole, and this lug in the apparatus as assembled projects beyond the lug of its adjacent standard 481, and resting against said lug lies in the path of motion of the lever 49, these levers all being assembled upon the pivot 482, one bell crank lever on each side of the lever 49 but facing in opposite directions, as clearly indicated by the drawings. The operation of this part of the apparatus is as follows: The lever 49, for example, see Fig. 4, being pushed to the right will press against the lug 504 of the bell crank lever 50 and raise its weight 502. If, now, the lever 49 be released, the weight 502 will fall, returning lever 49 to the left until the lug 504 is stopped by the lug on the member 481. For a movement of the lever 49 to the left, the weight attached to the bell crank lever 51 would be raised, otherwise the operation would be the same as just described.

Referring to Figs. 7 and 8, the numeral 8 designates as a whole the lower saw guide shown by the other figures of the drawing. This lower saw guide possesses the features of being quick opening, strong and rigid when in its guiding position, composed of but few parts, with the wooden blocks so held that they can be quickly adjusted or removed and renewed. It consists essentially of the U-shaped plate 80 which is secured to the bed plate of the saw by a fixed pivot 81 which takes the form of a holding-down bolt about which the plate 80 is free to move, and a second bolt 82 which holds the guide down to the mill bed, this bolt passing through an aperture in the plate 80 which is of sufficient size to allow a limited pivotal movement of the plate 80 about the bolt 81 for the purpose of adjustment, this adjustment being effected by means of a pin 83 received within an aperture 84 in plate 80, said pin being provided with a transverse screw-threaded aperture with which the screw 85 coacts, said screw passing through an apertured block 86 which is secured to a fixed pivot 87 on the bed plate, lock nuts 88 being provided to prevent rotation of the screw after the parts have been adjusted.

Bolted to the limb 800 of the U-shaped plate 80, is a casting 801 provided with two rectangular shaped apertures 802 which are adapted to receive properly beveled hard wood blocks 803 which bear against the saw, and in conjunction with oppositely placed blocks retain the saw in its proper position. Each of these blocks is retained in place by a set screw 804, so that they can be readily adjusted or replaced. The other limb 805 of the U-shaped plate 80 has hinged thereon by the bolt 806, a casting 807, in all respects similar to the casting 801, but one end 808 of this casting is adapted to slide under nuts 809 upon the bolt 810.

The numeral 811 designates an operating lever pivotally secured to the plate 80 by a bolt 812, and to the inner end of this lever is pivoted a link 813, which in turn is pivoted to the casting 807, the link being provided with a pin 814 serving as a stop against which a projection 815 on the inner end of the lever 811 is adapted to rest to retain the guide in proper position with respect to the saw.

What I claim is,—

1. A saw guide comprising a base provided with two members between which a saw is adapted to be received, said base being provided with a pivot about which it is adjustable, means for adjusting said base, a block carrying member rigidly secured to one of the members of said base, a second block carrying member pivotally secured to the other of said members, a lever permanently fulcrumed on said base for moving said last mentioned block carrying member about its pivot, and a link permanently connected between the lever and the second block carrying member whereby said member may be fully thrown open without necessitating detaching of parts.

2. The combination in a band saw, of a saw guide, means for adjusting said guide, means for operating said adjusting means and means for controlling said operating means including a lever, weighted bell cranks tending to return said lever to neutral position with increasing force and means for arresting said bell cranks at neutral lever position.

In testimony whereof, I affix my signature in the presence of two witnesses.

WILLIAM H. TROUT.

Witnesses:
H. C. CASE,
FRANK E. DENNETT.